United States Patent [19]

Marsiglio et al.

[11] 4,421,228
[45] Dec. 20, 1983

[54] PERIODICALLY ALIGNING AN ENDLESS WEB

[75] Inventors: Carl M. Marsiglio, Spencerport; John P. Swapceinski, Bergen, both of N.Y.

[73] Assignee: Eastman Kodak Company, Rochester, N.Y.

[21] Appl. No.: 293,577

[22] Filed: Aug. 17, 1981

[51] Int. Cl.³ .............................................. B65G 23/44
[52] U.S. Cl. ...................................... 198/814; 198/840
[58] Field of Search ............... 198/814, 813, 815, 816, 198/806, 840, 807, 810; 271/275, 198; 226/15, 16, 18, 3 R, 3 BE

[56] References Cited

U.S. PATENT DOCUMENTS

| | | | |
|---|---|---|---|
| 2,788,883 | 4/1957 | Schwenk | 198/813 |
| 3,357,347 | 3/1966 | Xerox . | |
| 3,770,108 | 11/1973 | Ettel | 198/807 |
| 3,921,793 | 11/1975 | Hutchinson et al. | 198/813 |
| 3,973,446 | 8/1976 | Vasilantone . | |
| 4,079,834 | 3/1978 | Fletcher, Jr. et al. | 198/810 |
| 4,286,706 | 9/1981 | Castelli et al. | 198/806 |

*Primary Examiner*—Joseph E. Valenza
*Assistant Examiner*—Dennis J. Williamson
*Attorney, Agent, or Firm*—Lawrence P. Kessler

[57] ABSTRACT

Web-tracking method and apparatus periodically reduces tension on endless web, laterally adjusts the position of the web, and then restores web tension.

7 Claims, 2 Drawing Figures

PERIODICALLY ALIGNING AN ENDLESS WEB

BACKGROUND OF THE INVENTION

1. Field of the Invention

This invention relates to method and apparatus for periodically adjusting the position of an endless web.

2. Description of the Prior Art

Endless webs trained about rollers have a tendency to become misaligned. In an extreme case, they run off the ends of such rollers. A misaligned web can be damaged by abrasion with roller side guides. The lateral wandering of a web at a roller is caused by crosstrack frictional forces. Prior web apparatus for aligning a flexible moving web about an endless path include two types of cylindrical rollers, or supports: (1) laterally constraining rollers and (2) laterally nonconstraining rollers. Laterally constraining rollers often include web-engaging portions which engage and center the moving web. These portions are spaced a distance apart which is slightly larger than the width of a moving web. Laterally nonconstraining rollers change their spatial orientation in response to the lateral movement of the web. There are active and passive systems which use such nonconstraining rollers. In the active category, servo-controlled rollers laterally position a web under the control of an external mechanism which senses web misalignment and triggers a compensating mechanism to return the web to an aligned position. See for example, U.S. Pat. No. 3,973,446 to Vasilantone. Passive systems often include castered and gimballed rollers having edge guides.

SUMMARY OF THE INVENTION

Commonly assigned U.S. Pat. Nos. 3,973,446; 3,974,952; and 3,986,650 contain explanations of the web alignment theory, especially as it relates to passive systems. This theory is based upon the assumption that webs movable about an endless path must be held under tension. In many applications, such as high-speed copier/duplicators, this assumption is necessary. Prior art web alignment apparatus have performed satisfactorily; however, they are usually expensive to construct, install, and maintain.

The present invention recognizes that in other applications, such as in low-speed copier applications, it is not necessary to continuously hold the web under tension. When web tension is significantly reduced, frictional forces acting on the web are reduced nearly to zero. Greatly simplified aligning apparatus can be employed because with little or no tension, very small forces are needed to move the web laterally. In accordance with the present invention, after web tension is reduced, a light spring force or a simple jogger can return the web to a desired lateral position. Web tension is then restored. Given the right blend of roller alignment tolerances and belt trueness, the web can be driven through several revolutions before waviness, slack edges or lateral wandering become appreciable. Periodic release of web tension will let the wrinkles fall out and permit the web to be laterally recentered in order to keep lateral wandering within an acceptable range.

In the disclosed embodiment of the invention, a web-supporting apparatus includes two spaced rollers. An endless web is trained about such rollers and held under tension. In response to reduced web tension, spring loaded web-engaging portions adjust the position of the web relative to the rollers. Means are provided for periodically reducing and then increasing web tension, such that during intervals of reduced web tension, the web-engaging portions adjust the lateral position of the web.

DESCRIPTION OF THE PREFERRED EMBODIMENT

Figure 1:
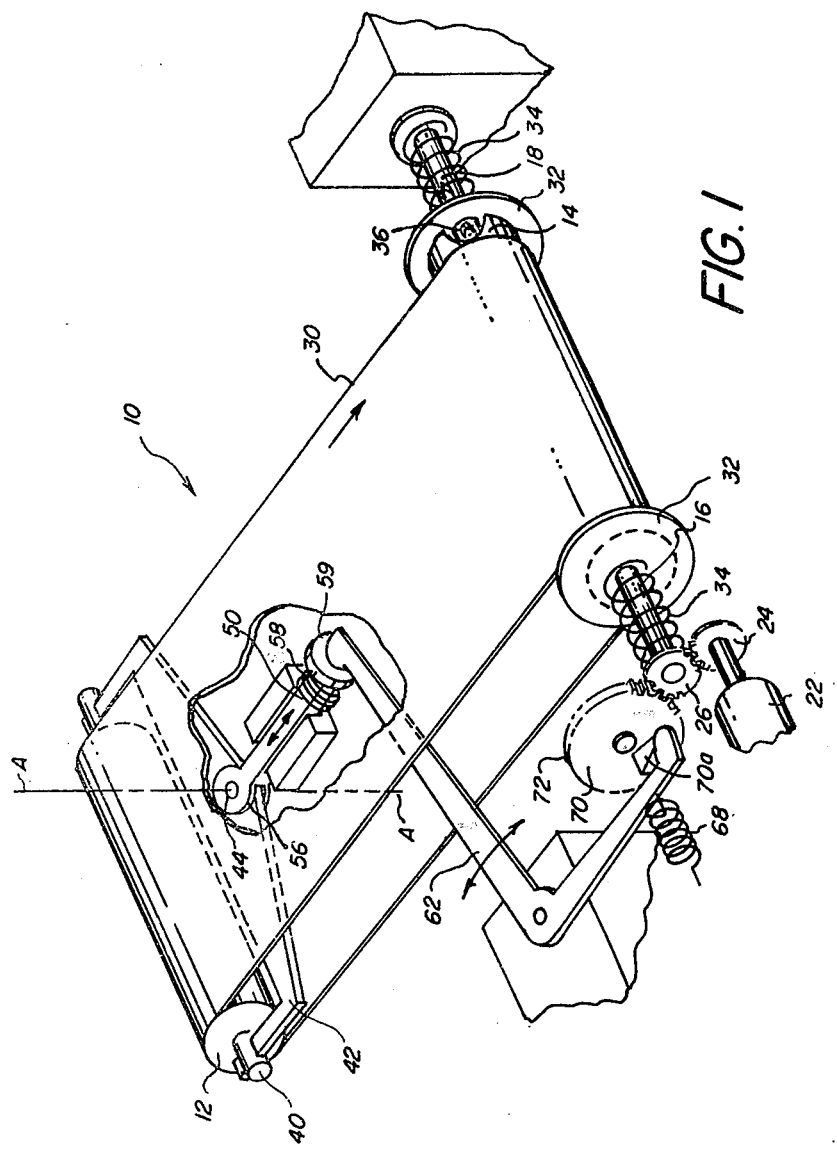
FIG. 1 is a perspective of web alignment apparatus embodying the present invention.
Figure 2:
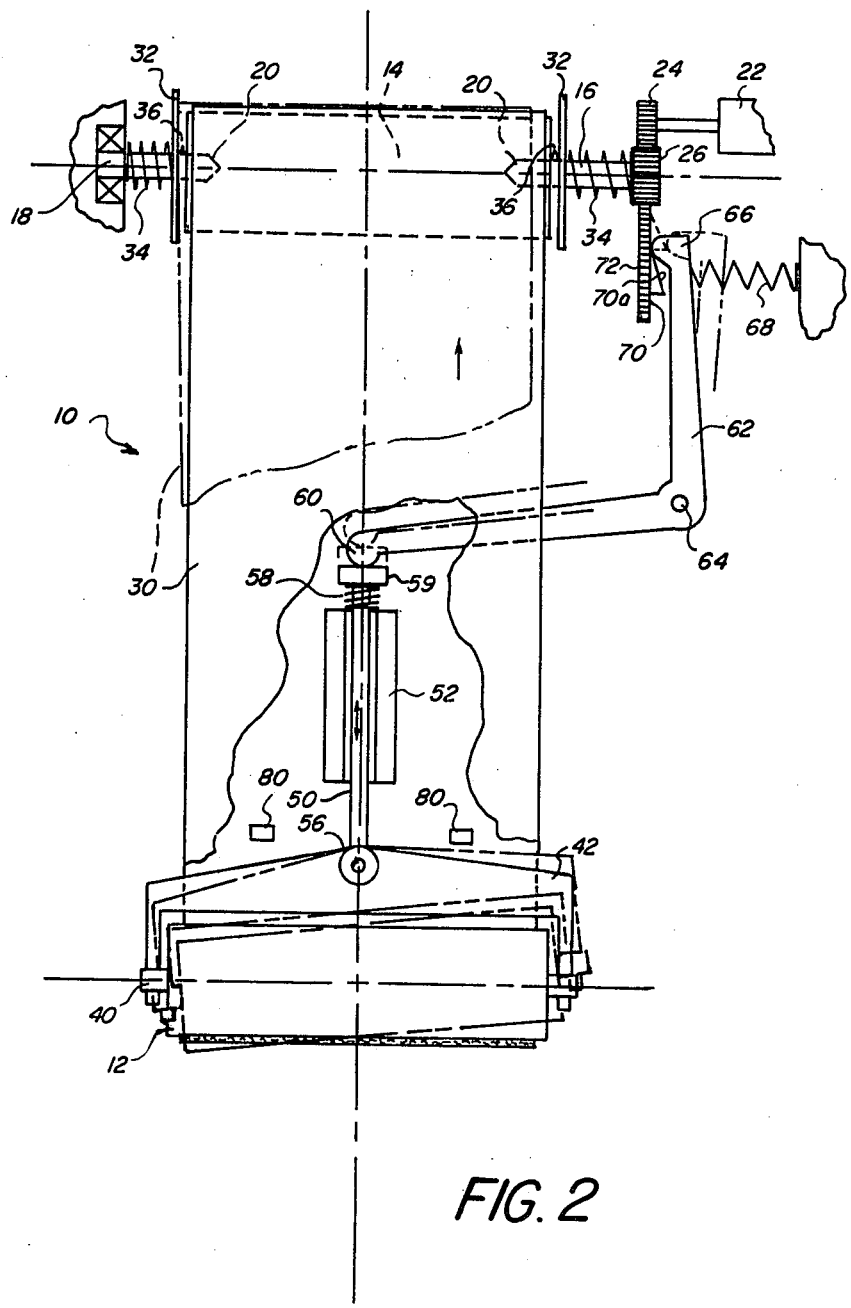
FIG. 2 is a plan view of the apparatus of FIG. 1.

Reference is now made to FIGS. 1 and 2, where a web tracking apparatus 10 is shown. It will be understood that this apparatus is especially suitable for use in a low-speed copier machine. For clarity of illustration, the various stations of such a copier have not been shown. However, reference may be made to commonly assigned U.S. Pat. No. 3,914,047 for descriptions of such stations.

The apparatus 10 includes two spaced, hard-surface cylindrical rollers or supports 12 and 14. Rotatable spindles 16 and 18 lock into detents 20 formed in the end surfaces of the roller 14 and laterally constrain the roller. A motor 22 drives a gear 24 that meshes with a gear 26 formed on the end of spindle 16. When the motor 22 is energized, it drives the spindle 16 which rotates the roller 14.

A web 30 is trained about and held under tension by roller 14 and roller 12, which functions as an idler. The web defines an endless path. Roller 14 drives web 30 about such endless path. If apparatus 10 is used in a copier, then the web 30 may be a conventional photosensitive member which accepts and then selectively dissipates charge to form an electrostatic image.

Disposed adjacent to the opposite ends of roller 14 are web-engaging means which include two identical web-engaging portions 32. Compliant springs 34 mounted concentrically about the spindles 16 and 18 urge each web-engaging portion 32 into engagement with a stop 36 so that the portions 32 are slightly spaced from the ends of the roller 14. In this position, the portions 32 are spaced apart a distance which is larger than the width of the web 30. If the web 30 should move laterally, one of its edges will move off of the roller 14, engage one of the portions 32 and compress its spring 34.

Cylindrical roller 12 is rotatably mounted on bearings (not shown) fixed to a shaft 40. The shaft 40 is supported by a yoke 42 that is pivotably mounted on shaft 44. The axis of shaft 44 defines an axis of rotation A—A (FIG. 1). Roller 12 is laterally nonconstrained because it can rotate angularly about axis A—A. If crosstrack frictional forces (on roller 12 and/or roller 14) causes lateral displacement of the web 30, the roller 12 will move angularly about axis A—A such as, for example, from the dotted line position to the solid line position shown in FIG. 2. Since roller 14 is laterally constrained by spindles 16 and 18, the web moves laterally along the surface of the roller 14, engages a web-engaging portion 32 and compresses its associated spring 34.

If the web should continue to move laterally, the force exerted by the web-engaging portion may cause damage to the edge of the web. Before this occurs, the web 30 should be aligned. In accordance with the invention, at periodic intervals (say a number of revolutions of the web 30), tension is removed from the web 30. The compressed spring 34 then causes its associated web-engaging portion 32 to adjust the position of the web 30 relative to the rollers. Tension is then restored to the web.

A shaft 50 is mounted in a fixed block 52 and constrained by such block to translational movement. One end of the shaft 50 includes a bifurcated portion 56 which is fixed to the shaft 44. The bifurcated portion 56 surrounds the yoke 42 on shaft 44. The other end of the shaft 50 includes a raised portion 59. A compression spring 58 engages raised portion 59 and block 52 and urges such portion 59 into engagement with a lug 60 on one end of a crank member 62. The member 62 is pivotably mounted at its elbow on a pin 64. On the other end of the member 62, a cam follower portion 66 is urged by a spring 68 into constant engagement with the surface of a face cam 70 formed on a gear member 72.

While the cam follower 66 engages the flat portion of face cam 70, the crank 62 holds the shaft 50 such that the roller 12 applies tension to the web 30. The situation will now be described where the web 30 remains aligned (e.g. doesn't move laterally) during operation of apparatus 10. When the motor 22 is energized, it rotates gear 24. Gear 24 rotates gear 26 and spindle 16 which drives roller 14. The roller 14, in turn, drives the web clockwise as shown in FIG. 1. The gear 26 also rotates gear 72. At periodic intervals, the cam follower 66 engages a raised portion 70a on face cam 70. The crank pivots in a clockwise direction (see FIG. 1), and the spring 58 urges roller 12 towards the roller 14. This reduces the web tension. The yoke 42 eventually engages alignment stops 80. When the follower 66 rides off of the raised portion and returns to the flat portion of the face cam, the crank rotates counterclockwise and moves the shaft 50, such that roller 12 restores tension to the web.

With reference now to FIG. 2, the situation will now be described where the web becomes misaligned during operation of apparatus 10. Let us assume that the cam follower 66 is riding on the flat portion of the face cam 70 and further that crosstrack frictional forces cause the web 30 to move into engagement with the left-hand web-engaging portion 32, compressing its associated spring 34. Such misalignment causes the laterally nonconstraining roller 12 to rotate about axis A—A to its dotted-line position. After a predetermined interval, the cam follower 66 rides up on the raised portion 70a and the spring 58 causes the shaft 50 and the roller 12 to move towards the roller 14, reducing tension on the web 30. The yoke 42 first engages the right-hand alignment stop 80 (FIG. 2) and then the left-hand stop 80. The roller 12 is now positioned so that its axis is parallel to the axis of roller 14. During this interval of reduced web tension, the web-engaging portion 32, urged by its spring 34, acts as a jogger and laterally moves the web 30 to its solid-line position (FIG. 2). When the cam follower 66 rides off of the raised portion 70a onto the flat portion of the face cam 70, the crank 62 moves the shaft 50 and the roller 12 away from the roller 14, restoring tension to the web 30. While the web tension is reduced, the web 30 cannot be driven by the motor 22. However, when the tension is restored, the web 30 is again driven in a clockwise direction, as shown in FIG. 1. Although the preferred embodiment includes a laterally constraining roller and a laterally nonconstraining roller, it should be understood that both of these rollers can be laterally constrained. Moreover, more than two rollers can be used in tracking apparatus in accordance with the invention. It is believed this arrangement would require web realignment more frequently than does the preferred embodiment.

The invention has been described with reference to a preferred embodiment therefor, but it will be understood that variations and modifications can be affected within the spirit and scope of the invention. For example, although the invention has been described as being suitable in a low-volume copier, it will be apparent to those in the art that the invention also can be effectively employed in printers, presses, film processors, facsimile machines, and other apparatus employing endless webs.

What is claimed is:

1. Web-tracking apparatus, comprising:
    at least two web-engaging members for supporting an endless web and defining a path along which such web is movable, means for mounting one of said members to impart tension to the web; means cooperating with said tension imparting means for periodically reducing such tension; and means cooperating with said tension reducing means for laterally adjusting the position of the web relative to said members during intervals when web tension is reduced.

2. The invention as set forth in claim 1 wherein said members are spaced rollers and said laterally adjusting means includes two spaced spring-urged portions disposed adjacent to opposite ends of one of said rollers.

3. An improved method of maintaining alignment of an endless web trained about, held under tension by, and movable about a path defined by spaced members, the improvement comprising the steps of:
    a. periodically reducing web tension for a selected interval; and
    b. adjusting the lateral position of the web relative to such members during the interval of reduced tension.

4. In web-supporting apparatus for aligning a web movable along an endless path including first and second web-supporting, rotatable cylindrical rollers disposed in spaced relation adjacent to the path, and means for imparting web moving force to one of such rollers, the improvement comprising:
    a. second roller mounting means (i) for moving said second roller to selectively increase and reduce web tension and (ii) for supporting said second roller so that it changes its orientation in response to lateral movement of the web;
    b. web-engaging means located along the path and having spaced web-engaging portions, at least one of which engages and laterally adjusts the position of the web relative to said rollers during intervals when web tension is reduced; and
    c. control means coupled to said mounting means for periodically (i) moving said mounting means to a position at which web tension is reduced so that during such reduced tension said web-engaging means moves said web laterally to align the web on said rollers; and then (ii) moving said mounting means to reapply tension to said web so that said web moving force is effective to move the aligned web in the path.

5. The invention as set forth in claim 4 wherein said first roller is laterally constrained and said second roller is laterally nonconstrained and said edge guide means includes two spaced spring-urged portions disposed adjacent to opposite ends of said first roller.

6. The invention of claim 4 wherein said control means includes cam means, operatively associated with said mounting means and said first roller, for periodically moving said mounting means in response to rotation of said first roller.

7. The invention of claim 4 wherein said spaced web-engaging portions are mounted adjacent to the opposite ends, and movable along the longitudinal axis, of said first roller.

* * * * *